Patented Oct. 3, 1944

2,359,344

UNITED STATES PATENT OFFICE 2,359,344

SYNTHETIC SILICATE COMPOSITIONS

Charles C. Winding, Ithaca, N. Y., assignor to Tide Water Associated Oil Company, Bayonne, N. J., a corporation of Delaware No Drawing. Application November 14, 1941, Serial No. 419,109

16 Claims. (Cl. 252—300)

This invention relates to synthetic silicate compositions and to the preparation and use thereof in the industrial arts. In its broader and more general aspects, the invention is concerned with magnesium or magnesium-containing silicate compositions having adsorbent properties and especially adapted to the refining of liquids or solutions from which it is desired to remove coloring matter or other impurities which may be selectively adsorbed by an active solid refining agent. More particularly, the invention provides a magnesium or magnesium-containing silicate composition of active adsorbent character having physical properties necessary for use in the "percolation" method of refining liquids with solid adsorptive agents.

The silicate compositions here disclosed are formed by cation or base exchange between a suitable solid silicate and an aqueous solution of a soluble magnesium salt. Such "exchange" silicates and their preparation in percolant form are disclosed and claimed broadly in my copending application Serial No. 389,170, filed April 18, 1941. The present invention is concerned especially with an important factor or control in the preparation of "exchange" magnesium silicate percolant adsorbents; and the instant application accordingly constitutes a continuation-in-part of my said co-pending application Serial No. 389,170.

Solid adsorbent compositions, both of natural and synthetic origin, are used extensively in the removal of coloring matter or otherwise refining liquids and solutions. The treatment of petroleum fractions, especially viscous oils of lubricating character, is an important illustrative example of the use of adsorbents for the removal of undesired components or constituents.

Two distinct methods of refining liquids, such for example as lubricating oils, with solid adsorbent compositions are in general use. One of these is the procedure commonly designated as contact treatment, and the other is usually identified as percolation. The two operations differ radically in manipulative detail, each predicated upon and requiring a distinct type and form of adsorbent material.

In contact treatment, the adsorbent must be very finely divided, for example 200 to 300 mesh, and hardness or resistance to attrition is not a consideration. Such contact decolorizing material is agitated in a body of oil at elevated temperature for sufficient time to obtain the desired degree of refining, after which the decolorized oil is separated from the spent adsorbent, usually by filtration.

The percolation method requires a relatively coarse, granular adsorbent material and the percolant particles must have hardness to a degree at least sufficient to withstand breakdown or attrition loss in handling operations. In decolorizing oils by percolation treatment, a deep static bed of adsorbent material is provided through which the oil filters or percolates. When, by reason of adsorbing coloring matter from the oil, the adsorbent material shows diminished activity, oil flow is cut off. After draining and steaming in situ the adsorbent may be removed by a suitable conveyor system to a furnace, such as the familiar multiple hearth, rabble-arm type, and revivified by burning.

Thus, it will be apparent that preparation of a synthetic adsorbent involves consideration of its contemplated use. Depending upon whether the adsorbent is to be used in contact treatment or in a percolation method, distinct and different properties or characteristics are required. A given adsorbent material cannot be used alternatively as a contact agent or a percolant. Adsorbent compositions having the form and properties necessary for contact use have no utility in percolation methods of refining, while adsorbent material in percolant form will not function satisfactorily as a contact agent.

As indicated at the outset, this invention is concerned with synthetic adsorbents having the form and properties necessary to "percolant" refining agents and especially prepared for and adapted to use in the percolation method of decolorizing oils. More particularly, the adsorbents or oil decolorizing agents of this invention are synthetic magnesium silicate compositions prepared by a multi-stage method, including a base or cation exchange reaction and involving specific procedural steps and controls leading to the production of an active material in percolant form. A special feature of the overall method resides in the explicit regulation and control of operating conditions at one or more stages of the synthesis in advance of the base exchange step from which the percolant product results. It is by such regulation of operating conditions that it is possible to develop in the final exchange product the desired form, structure and other properties making for an active adsorbent material of the percolant type.

In my aforesaid co-pending application Serial No. 389,170 I have described broadly and in certain specific embodiment such a method for the production of active magnesium silicate adsorbents in percolant form. In general aspect that method includes the steps of preparing or providing a suitable calcium silicate and subjecting this in solid, sufficiently divided form to base exchange with a soluble magnesium salt in aqueous solution, thus producing an exchange magnesium silicate composition having percolant form and high oil decolorizing activity as such.

Considered in greater detail the process disclosed in my aforesaid co-pending application and with which the invention here is concerned may comprise the following steps and order of procedure:

1. Prepare a precipitated calcium silicate composition by reacting aqueous solutions of calcium chloride and sodium silicate.
2. Separate the precipitated calcium silicate as by filtration and wash for sufficient removal of chloride solution.
3. Dry the precipitated calcium silicate resulting from step (2).
4. Grind the dried material from step (3) to suitable particle size.
5. Screen the ground, dried calcium silicate material thus far obtained to remove "fines."
6. Subject the dried, ground and screened material from step (5) to cation or base exchange reaction with an aqueous magnesium chloride solution.
7. Separate the "exchange" magnesium silicate material as by filtration.
8. Dry and size the separate "exchange" magnesium silicate composition from step (7).

The foregoing series of operations in the indicated order constitutes the general method utilized according to the invention for the production of highly useful adsorbent compositions specially prepared for and adapted to percolation treatment of liquids. It will be understood, of course, that in certain specific respects the above stated operations are primarily illustrative and permit of some variation.

Thus, at step (1) the precipitated silicate need not be a calcium silicate. Barium or strontium silicate compositions may be prepared and used in the ensuing operations although less desirable or active "exchange" products apparently obtain. A precipitated calcium or calcium-containing silicate therefore is a more desirable starting material at step (1). Mixed silicate compositions are worthwhile and a particularly advantageous embodiment of this first operation entails preparation of a precipitated silicate material containing both calcium and magnesium by reacting with an aqueous sodium silicate solution an aqueous solution containing both calcium and magnesium chlorides.

The ratio of $Na_2O$ to $SiO_2$ in the sodium silicate used may vary but best results are obtained with a one to four (1:4) molal proportion. When higher ratios of $Na_2O$ to $SiO_2$ (for example 1:3 to 1:2) are used, the oil decolorizing activity of the ultimate adsorbent product is somewhat lower than is the case when a one to four ratio sodium silicate is used for production of the initial precipitated silicate material.

Again, at the base exchange stage, step (6) in the foregoing general procedure, the exchange solution is not necessarily a pure magnesium chloride. Mixed chloride or equivalently useful soluble salt solutions may be used to advantage provided sufficient magnesium ions are present to replace calcium ions in the solid silicate with which the base or cation exchange reaction is effected. As an example, aqueous exchange solutions containing both magnesium and calcium chlorides give worthwhile results, in some respects superior to results obtained using straight magnesium chloride solutions. This condition holds for various types of solid precipitated silicate compositions produced as indicated hereinbefore in connection with the preliminary discussion of step (1). Several commercial brine solutions are available on the open market in which the ratio of magnesium chloride to calcium chloride varies from 1:2 to 1:3 and these or similar mixed salt solutions, for example solutions in which the magnesium to calcium ratio is about one to one, may be utilized as exchange solutions in step (6) of the general process of the invention.

The exchange reaction may be carried out as a one stage batch operation but usually is better conducted in a plurality of successive batch stages, as for example in 2, 3 or more stages using fresh exchange or treating solution at each stage. Particularly when using mixed salt solution of relatively low magnesium to calcium ratio is such successive or multi-stage procedure desirable. The advantage of such treatment resides not only in degree of completeness as to base exchange but also in certain improvement of percolant adsorbent quality and activity. Continuous counter-current or semi-counter-current operation may be desirable.

Other ramifications of the general method regarding the use of equivalents or alternatives as to materials and operations or combination of steps will be designated or appear clearly hereinafter as the instant disclosure proceeds.

It is an important feature and advantage of the invention common to this and my co-pending application Serial No. 389,170 that desired characteristics, particularly form, physical structure and percolant decolorizing activity, in the final "exchange" adsorbent composition are predetermined and imparted in the steps and by control of operating conditions preceding the cation or base exchange reaction stage at which the percolant adsorbent product of the invention is produced. Viewed in another aspect, this feature of the invention embraces the concept that necessary physical properties and adsorbent activity of the percolant material, produced in the base exchange operation of the process, depend directly upon and are determined directly by the characteristics and properties of the calcium-containing (or suitable equivalent) silicate material which enters the aforesaid base exchange reaction step. As will appear more fully hereinafter, these essential properties of the precipitated silicate material at the base exchange reaction stage in turn result from prescribed operations and control of operating conditions in the early stages of the general process.

Accordingly, the invention is concerned in an important embodiment with the production of a suitable or preconditioned silicate material or composition for use in a cation or base exchange reaction with an aqueous magnesium-containing soluble salt solution to produce directly from such base exchange stage a magnesium-containing silicate composition which after drying has properties characteristic of and necessary to a percolant type adsorbent of high oil decolorizing activity.

As indicated hereinabove, preconditioned silicates suitable for use in the exchange reaction may be prepared, according to the invention, by precipitation methods in which alkali metal silicates are reacted with metal salts in aqueous solution. In this precipitation step certain control or regulation of conditions is important. One important control factor is concentrations of the reactants or precipitants employed. As set forth in my aforesaid copending application, certain solutions of precipitants within particular ranges of concentrations produce requisite hardness and other desired properties in the precipitated material to be used in the exchange reaction whereas reactant solutions of other concentrations result in soft or otherwise undesired products. Thus, when using the described sodium silicate solution and calcium chloride solution as the reactants, concentrations ranging from about 0.08 molar to about 0.25 molar are essential to production of the desired type of precipitated silicates. Concentrations of about 0.05 result in precipitates convertible by exchange to final products of unsatisfactory decolorizing activity while concentrations above about 0.25 produced precipitated silicates of undesired soft structure.

Control of concentrations also is important in instances where as the precipitant to be reacted with soluble silicate there are used solutions of salts of metals other than calcium or in addition to calcium salts. In such cases the desired concentration ranges of the reactant solutions may not be necessarily the same as that stated above. Thus, in certain instances when using as one reactant solutions containing both calcium and magnesium salts, reactant concentrations of from about 0.15 molar to about 0.3 molar (combined concentration of calcium and magnesium salts in case of the mixed salt solution) produce precipitates of desired physical properties which can be converted by the exchange reaction to highly active final products. Use of concentrations of these reactant solutions of substantially less than 0.15 molar, as for instance 0.1 molar, results in a sharp lowering of decolorizing activity in the final product, while concentrations substantially above 0.3 molar result in precipitates of relatively soft structure which upon grinding break down to a large proportion of fines. Thus, for example, calcium-magnesium silicates precipitated from 0.4 molar solutions result in only about 50% percolant sized material convertible to an active exchange product upon grinding, and the remainder constitutes fines of particle size too small for percolant use.

At this point it should be understood that while it is desirable to employ the two reactants (i. e., alkali metal silicate solution and metal salt solution) in equal molarities, the invention is not to be limited thereto, since reactant solutions of any suitable respective molarities effective to produce in the precipitated material the desired physical properties and capacity for conversion to exchange products of satisfactory decolorizing power and percolant effectiveness may be used.

All references herein to molarity of alkali metal silicate solutions indicate molarity with respect to alkali metal oxide contained therein.

Further as respects instances in which the metal salt precipitant solution also contains a magnesium salt, the proportional amount of the magnesium salt therein should not be excessive since material lowering of the decolorizing power of the final product will result. For example, when employing as this precipitant a solution of magnesium chloride and calcium chloride, substantially more than 50 mol per cent $MgCl_2$ (and 50 mol per cent $CaCl_2$) should not generally be used. The stated solution and those of lower magnesium contents result in precipitates convertible to highly active oil decolorant adsorbents, while if materially higher magnesium contents (for example, 70 mol per cent $MgCl_2$ and 30 mol per cent $CaCl_2$) are used the final product possesses only low decolorizing activity.

The precipitation procedure then comprises reaction of a suitable alkali metal silicate in solution and a suitable metal salt in solution to form the desired silicate. In practice the solutions are heated, for example to 90° C., and the latter named solution is added to the first. The reaction mass may be agitated. Precipitation from hot solutions is preferable in most instances as giving precipitates convertible to exchange products of optimum decolorizing power, but in certain cases where the alkali metal silicate is to be reacted with metal salt solutions containing magnesium in relatively high proportion lower temperatures may be employed with advantage. For example, room temperature precipitation results in final exchange products of somewhat higher decolorizing power than does high temperature precipitation in cases where the precipitant to be reacted with alkali metal silicate contains about 50 mol per cent $MgCl_2$ and 50 mol per cent $CaCl_2$.

After the precipitation step the slurry-containing precipitated silicate is filtered, washed for sufficient removal of soluble salts and dried.

The degree to which the precipitated silicate is dried prior to its use in the exchange reaction is an important factor. This and the drying operation in conjunction with other steps of the process constitute important features of this invention. Exchange magnesium silicate final products having either substantially no percolant oil-decolorizing activity or high percolant oil-decolorizing activity can be produced from silicates of improper or proper water contents respectively. Provision or preparation of silicates of proper water content for use in the exchange reaction is an important feature of this invention. The filtered precipitate, produced as above described, is a gelatinous mass which may contain over 90% of water and which cannot be reduced to discrete, solid particles. Treatment of the precipitate in this condition with magnesium salt solution in exchange reaction results only in a final product of substantially no oil-decolorizing power when used in percolant decolorizing methods.

According to this invention, it has been found that the stated silicate material should have no more than a certain water content in order that exchange magnesium silicate adsorbents of satisfactory percolant effectiveness can be produced therefrom. While the actual maximum water content permissible in all cases and for each particular silicate material employed may vary and no one value can be stated which will hold in all instances, satisfactory results may be obtained in any case by removing sufficient water in the drying operation so that the resulting dried material can be ground or similarly reduced to discrete solid particles. Of course in the drying operation overheating which may destroy the capacity of the material for conversion to final products of active decolorizing power should be avoided. Drying experiments in which experimental batches of calcium silicates, precipitated by reacting alkali metal silicate solutions with calcium chloride solutions, were dried under various temperature and time conditions indicate that these calcium silicates must be dried to a total water content (as determined by amounts of water driven off by heating samples to 1000° C. to 1200° C. for two to three hours) not exceeding about 70 per cent for obtainment of a grindable product capable of conversion by exchange reaction to satisfactory percolant adsorbents. Below 70 per cent the water content is apparently not critical; dried silicates containing various lower proportions of water (total water) are satisfactory. Those containing only about 2 per cent water, for example, can be converted to active exchange products.

Various drying temperatures and drying periods may be used depending to some extent upon the particular apparatus and mode of operation employed. In general, the higher temperatures will require shorter heating periods, but the material should not in any case be heated to a temperature and for a period destructive to its capacity for conversion by exchange reaction to active adsorbents, as indicated hereinbefore. Satisfactory products are obtained by drying in atmospheres of temperatures up to 800° C. but at these higher temperatures the drying period is necessarily very short to avoid overheating. Drying temperatures of from about 300° C. to about 600° C. are particularly effective in usually resulting in optimum activity in the final exchange product.

The silicate material resulting from the drying operation is in the form of a mass of hard particles of varying size depending on the degree of subdivision of the cake charged to the dryer which is not readily powderable. The dried material is then ground to suitable particle size. Grinding may be accomplished by use of any suitable grinding equipment. Satisfactory results are obtained by use of a disc grinder composed of stationary and rotating grinding discs, and preferably using the free rather than the choked grinding method.

Preferably the material is reduced to percolant particle size, for example 30–60 mesh, in order that percolant sized exchange magnesium silicate will be obtained directly in subsequent steps, as will be later explained.

The ground material is then desirably screened to remove fines and the silicate material which is in the form of sized discrete particles of hard granular structure is subjected to cation or base exchange reaction by treatment with a solution containing magnesium ions to exchange the latter with those of the exchangeable metal in the solid silicate. As stated hereinabove, the exchange solution may contain compounds in addition to those of magnesium and may vary considerably in concentration provided that sufficient magnesium ions are present therein to replace the metal ions of the solid silicate with which the base or cation exchange is effected. For example, good results are obtained when using magnesium chloride solutions of 0.15 molar to 1.0 molar concentrations. Likewise, instead of the batch or countercurrent methods of treatment referred to hereinabove, other methods or variations may be employed. For example, the treating solution may be flowed through a static bed of the silicate material.

Use of magnesium sulfate instead of magnesium chloride or in addition to magnesium chloride in the treating solution is satisfactory, and one of the advantages of the method of this invention is that insoluble sulfates formed by reaction of magnesium sulfate of the treating solution with metals of the silicate being treated can be readily removed and need not be left in association with the exchange magnesium silicate to exert a diluent effect and reduce decolorizing effectiveness. These insoluble sulfates form as very finely divided particles having extremely low settling rates as compared to the percolant sized particles of exchange magnesium silicate. By agitating slightly, the insoluble sulfate particles become suspended in the treating liquid and a major portion thereof can be removed by simple decantation of the liquid leaving the larger exchange magnesium silicate particles behind. Any convenient method can be used in which advantage is taken of the difference in particle size. Thus, the method of this invention permits of use as the treating solution of brines containing magnesium sulfate with production of exchange magnesium silicate final products of high decolorizing effectiveness.

The mass of exchange magnesium silicate material resulting from the exchange operation is then filtered, washed, and dried. Drying may be conducted by heating under any conditions not destructive to the percolant decolorizing activity or physical properties of the material. Prolonged drying at temperatures above about 700° C. is generally destructive to desired percolant properties and should be avoided.

The exchange magnesium silicate prior to drying consists of a mass of wet particles resembling wet sand. The dried product is a mass of free-flowing granular particles of sizes depending upon the particle sizes of the solid silicate used in the exchange reaction. As indicated hereinabove, obtainment of percolant sized final product by use of percolant sized solid silicate is an important and advantageous feature of this invention. Since percolant sized final product may be obtained directly, grinding at this stage of the process is unnecessary.

The product from the drying operation usually contains a very low proportion of fines and for many uses need not be screened for removal thereof. For special uses screening may be resorted to if desired.

Substantial amounts of the exchangeable metal of the solid silicate is converted to magnesium in the exchange reaction, the exact amount depending upon the procedure or mode of operation employed. Conversions of 80% or more are obtained in typical instances. The final product, in cases where less than 100% conversion is obtained, will therefore contain a substantial proportion of exchange magnesium silicate and a lesser amount of unconverted precipitated metal silicate.

The following illustrative examples set forth the invention in various embodiments.

*Example I*

To an aqueous sodium silicate (ratio $Na_2O/SiO_2$ of 1:4) solution of a concentration based on $Na_2O$ content of 0.15 molar there was added an equal volume of an aqueous solution of commercial grade calcium chloride of 0.15 molar concentration, both solutions being preheated to about 90° C. prior to mixing. The resulting mass was agitated and maintained at about 90° C. until precipitation was complete. The resulting slurry was then filtered and the precipitate washed.

The filter cake comprising calcium silicate was then placed in a laboratory muffle furnace preheated to 550° C. and heated therein for 2½ hours. Thermocouples, placed in the material being heated and in the heating atmosphere, showed that the temperature of the latter had dropped to 330° C. at the end of ½ hour and had risen to about 500° C. at the end of the 2½ hour heating period. The material temperature rose rapidly at first to 100° C. where it remained for about ½ hour and then rose rapidly during the remainder of the period, reaching 480° C. at the end of the 2½ hour period. The dried material was removed from the furnace and allowed to cool. Analysis of a small sample for total water content (by heating to red heat) showed the material, dried as just described, to contain 2.6% total water.

The dried material was then ground in a disc grinder and screened to 30-60 mesh particle size. The resulting calcium silicate 30-60 mesh particles were then added to a magnesium chloride solution of 0.5 molar concentration and 90° C. temperature and the resulting mixture of solids and liquid was mildly agitated at this temperature for one hour. The treating solution was then drawn off, fresh solution added, and the treatment repeated using fresh treating solution. After withdrawing the resulting solution, a third and similar one-hour treatment using a fresh portion of the treating solution was conducted.

The resulting mixture was filtered and washed to remove treating solution. The filter-cake was then dried in a laboratory muffle furnace. In drying, the furnace was preheated to 560° C. and the material was heated therein for about one hour at temperatures not exceeding 560° C.

The dried material, upon removal from the furnace, was composed of free-flowing particles of exchange magnesium silicate. This material was allowed to cool and then screened for removal of fines, resulting in 30-60 mesh particles suitable for use in percolation decolorization methods.

*Example II*

Two solutions were prepared, one consisting of 30 mol per cent $MgCl_2$ and 70 mol per cent $CaCl_2$ in combined concentration of $MgCl_2$ and $CaCl_2$ of 0.2 molar. The other solution consisted of the sodium silicate described in Example I in 0.2 molar concentration as to $Na_2O$ content. With both solutions at about 90° C. the chloride solution was added to the silicate solution with agitation and subsequent precipitation; washing and filtering operations were carried out in the manner described in Example I.

The filter cake, this time consisting of "calcium-magnesium silicate" (which is of unknown exact chemical structure, but which may be a mixture of magnesium silicate and calcium silicate, or a complex or double silicate of these metals) was dried by heating in a laboratory muffle furnace preheated to 500° C. for 3 hours in the manner set forth in Example I.

The dried material was then ground and screened to 30-60 mesh particle size, and the sized particles were subjected to exchange reaction in the manner and with the magnesium chloride treating solution set forth in Example I.

The mixture resulting from the exchange reaction containing exchange magnesium silicate was then filtered, and the solids washed and dried as in Example I and the dried particles were screened, resulting in percolant sized adsorbent material.

*Example III*

In this case the material employed in the exchange reaction was dried and ground calcium-magnesium silicate which had been precipitated in the manner set forth in Example II, and the exchange solution was a solution containing equal mol per cents of $MgCl_2$ and $CaCl_2$, the total concentration of these two substances in solution being 0.5 molar. The exchange procedure and subsequent steps of Example I were followed to produce the exchange magnesium silicate percolant final product.

*Example IV*

Calcium silicate was precipitated, filtered and washed as set forth in Example I. The filter-cake was dried to a water content (total) of 69.7% (total) by heating at 110° C. in the muffle furnace for about 14 hours.

The dried material was ground by hand and screened to 30-60 mesh particle size. The sized material was then subjected to the exchange reaction and steps subsequent thereto in the manner disclosed in Example I. An active percolant adsorbent was obtained.

All of the adsorbents produced according to the above examples possessed high decolorizing activity, as will be shown by the test data appearing hereinbelow.

The silicates of Example V below were produced by a method differing from that of Examples I to IV and all possess very low decolorizing activity. In Example V the procedure of the present invention, illustrated in Examples I to IV, was not followed because the precipitated silicates were too wet to permit grinding to particles prior to the exchange treatment.

*Example V*

Three batches of calcium silicate were precipitated, filtered and washed as in Example I. The first batch was then dried to 75.5% water content (total); the second batch was dried to 81.2% water content (total); and the third batch was dried to 91.8% water content (total). These three samples, having the stated water contents, were then separately subjected to the exchange treatment and the resulting products filtered, washed and dried in the manner disclosed in Example I. The resulting dried materials, as distinguished from those obtained in Examples I to IV, were non-particulate masses.

Each batch was ground and screened to 30-60 mesh particle size. The low decolorizing activities of these materials will be apparent from the test data appearing hereinbelow. In the tabulated data the final products resulting from use in the exchange reaction of the stated three silicates containing 75.5%, 81.2% and 91.8% total water respectively are designated as (1), (2) and (3) respectively.

The products resulting from the methods of the above disclosed examples were each tested for oil-decolorizing effectiveness as percolant adsorbents for oil filtration. The oil used in the test was an undecolorized, undewaxed Pennsylvania lubricating oil stock of 26.1 gravity, 50° F. pour point, 550° F. flash (closed cup) and 147 seconds Saybolt viscosity at 210° F. Said oil had an optical density color value of 2620 O. D. as measured by the method of Ferris and McIlvain as described in Industrial and Engineering Chemistry, Analytical edition 6, 23 (1934), except that a Bausch and Lomb monochromatic green filter was used as the source of monochromatic light. This oil was first diluted with decolorized Stoddard's solvent to give a solution of 40% oil and 60% Stoddard's solvent by volume. The oil solution was then run slowly through a bed of the adsorbent. The bed consisted of 100 c. c. of adsorbent (measured without tapping), the bed being 21 inches deep. The adsorbent was maintained at approximately 135° F. during filtration of the oil therethrough. When the oil in all of the oil solution which had passed through the filter had reached a color corresponding to a 7 A. S. T. M. color as determined by comparisons with samples of known color, the run was considered complete. The run required about 4 hours time.

From the volume of oil filtered and the volume of adsorbent used in the test the volume ratio was computed. Volume ratio is the ratio of the volume of decolorized oil, exclusive of the solvent, to the volume of adsorbent used. The results are summarized in the following table, which includes data obtained by testing as described the silicates of Examples I to V and that obtained by testing under the same test conditions an adsorbent which is now commercially used in percolation lubricating oil decolorization. The latter material is designated as adsorbent "A."

| Adsorbent | Volume ratio |
|---|---|
| Example I | 2.9 |
| Example II | 2.8 |
| Example III | 2.8 |
| Example IV | 2.2 |
| Example V: | |
| (1) | 0.4 |
| (2) | 0.4 |
| (3) | 0.0 |
| Adsorbent "A" | 1.6 |

The foregoing data illustrate the decolorizing effectiveness of the compositions of this invention in contrast to those produced by other methods and to a widely used commercial percolant oil-decolorant (A).

Percolant adsorbents of the present invention after use, in oil decolorization for example, are readily revivified by burning. It is a particular advantage of said adsorbents that they maintain decolorizing effectiveness after many cycles of use and revivification.

I claim:

1. Method for preparing magnesium silicate adsorbent compositions adapted for use in percolation decolorizing methods comprising reacting in aqueous solution a soluble silicate and a salt of an alkaline earth metal replaceable in cation or base exchange reaction by magnesium, to produce a precipitated alkaline earth metal silicate having desired properties, drying the precipitate to produce a hard mass which can be reduced to discrete solid particles, reducing said mass to desired particle size and treating the resulting particles with an aqueous solution containing magnesium ions to exchange alkaline earth metal ions of said alkaline earth metal silicate with magnesium ions.

2. Method for preparing magnesium silicate adsorbent compositions adapted for use in percolation decolorizing methods comprising reacting a suitable aqueous solution containing a dissolved alkali metal silicate with a suitable aqueous solution containing a calcium salt to produce a precipitate of calcium-containing silicate convertible to active magnesium silicate by exchange reaction, drying said precipitate to a hard mass, reducing said hard mass to percolant sized particles, treating said particles with a solution containing magnesium ions to exchange calcium ions of the calcium-containing silicate with magnesium ions and produce exchange magnesium silicate material, and drying the exchange magnesium silicate material.

3. Method for preparing magnesium silicate adsorbent compositions adapted for use in percolation decolorizing methods comprising reacting in hot aqueous solution a suitable alkali metal silicate and a suitable calcium-containing substance to produce a precipitated calcium-containing silicate convertible to active magnesium silicate by exchange reaction, drying said calcium-containing silicate sufficiently to produce a grindable material, grinding and sizing said material to percolant particle size, treating the sized particles with a solution containing magnesium ions to exchange calcium ions of the calcium-containing silicate with magnesium ions and produce percolant sized particles of magnesium silicate composition.

4. Method for preparing magnesium silicate adsorbent compositions adapted for use in percolation decolorizing methods comprising reacting a hot aqueous solution containing sodium silicate and a hot aqueous solution containing calcium chloride to produce a precipitate of calcium-containing silicate having desired properties, filtering, washing and drying said calcium-containing silicate to a mass which can be reduced to desired particle size, reducing said mass to desired particle size, treating the resulting particles with an aqueous solution containing magnesium ions to exchange calcium ions of the calcium-containing silicate with magnesium ions and produce particles of magnesium silicate composition and drying the resulting particles.

5. Method for preparing magnesium silicate adsorbent compositions adapted for use in percolation decolorizing methods comprising adding to a solution containing sodium silicate a solution containing calcium chloride and heating the mixture to produce a precipitate of calcium-containing silicate, filtering, washing and drying the precipitate to produce a hard mass which can be reduced to percolant particle size, reducing said mass to percolant particle size, treating the resulting particles with an aqueous solution containing magnesium chloride to exchange calcium ions of the calcium-containing silicate with magnesium ions and produce magnesium silicate composition in percolant particle size, and drying the resulting particles.

6. In a method for producing a magnesium silicate composition effective as an adsorbent in the percolation filtration of lubricating oils the steps comprising reacting in aqueous solution an alkali metal silicate of concentration from about 0.08 to about 0.25 molar based on the alkali metal oxide therein and a calcium salt of a concentration of from about 0.08 to about 0.25 molar to produce a precipitated calcium silicate having desired physical properties, drying said calcium silicate, then treating the dried calcium silicate with a magnesium salt solution to exchange calcium ions of the calcium silicate with magnesium ions.

7. Method as described in claim 6, in which the alkali metal silicate is a sodium silicate having a ratio of silica to sodium oxide of about 4 to 1.

8. In a method for producing an active magnesium silicate composition effective as an adsorbent in the percolation filtration of lubricating oils the steps comprising reacting in aqueous solution sodium silicate having a ratio of silica to sodium oxide of about 4 to 1, in concentration greater than 0.05 molar but not greater than about 0.25 molar based on $Na_2O$ thereof, and a calcium salt in concentration greater than 0.05 molar but not greater than about 0.25 molar to produce a precipitate of calcium silicate, drying said precipitate, reducing the dried precipitate material to desirable particle size and treating the resulting product in solid condition to a cation exchange reaction to exchange calcium ions of the calcium silicate with magnesium ions.

9. Method as described in claim 8, in which the calcium silicate precipitate is dried at about 120° C. for a period of from about 20 to about 42 hours.

10. Method as described in claim 8, in which the calcium salt precipitant is calcium chloride.

11. In a method for producing an active magnesium silicate percolant adsorbent composition the steps comprising reacting in aqueous solution an alkali metal silicate in effective concentration not substantially greater than 0.25 molar based on the alkali metal oxide therein and a calcium salt in effective concentration not substantially greater than 0.25 molar to produce a precipitate of calcium silicate of desired physical properties, drying said calcium silicate, then treating the dried calcium silicate in solid form with an aqueous solution of a magnesium salt to exchange calcium ions of the calcium silicate with magnesium ions.

12. Method for producing a magnesium silicate composition effective as an adsorbent in percolation filtration of lubricating oils which comprises precipitating a calcium silicate from aqueous solution, filtering and drying the precipitate to produce a dried filter cake, said precipitation being conducted under conditions effective to produce in the dried filter cake a hard granular structure, subsequently reducing the dried filter cake to desired particle size and treating the resulting calcium silicate particles with a magnesium salt solution to exchange calcium ions with magnesium ions.

13. Method for producing a percolant oil decolorizing magnesium silicate composition which comprises adding to an aqueous sodium silicate solution of concentration from about 0.08 molar to about 0.25 molar based on the $Na_2O$ content an aqueous solution of a calcium salt of from about 0.08 molar to about 0.25 molar concentration and maintaining the temperature at about 80° to 90° C. to produce a precipitate of calcium silicate, filtering and drying the filter cake, reducing the dried filter cake material to desired particle size and treating the resulting calcium silicate with a hot magnesium salt solution containing more equivalents of magnesium than the equivalents of calcium in the calcium silicate to exchange calcium ions of the calcium silicate with magnesium ions.

14. In the decolorization of mineral lubricating oils the method comprising passing the oil to be decolorized through a bed of granular particles of magnesium silicate composition, said composition having been produced by precipitating calcium silicate from hot aqueous solutions comprising an alkali metal silicate in concentration from about 0.08 to about 0.25 molar and a calcium salt in concentration from about 0.08 to about 0.25 molar, drying the precipitate and reducing the resulting filter cake to percolant size particles and thereafter treating said particles with a magnesium salt solution to exchange calcium ions of the calcium silicates with magnesium ions.

15. Method of refining mineral oils comprising treating the same with an active magnesium silicate composition prepared as described in claim 11.

16. An exchange magnesium silicate composition having oil decolorizing activity and specially characterized by physical properties including a hard granular structure making it suitable for percolation oil filtration, said composition having been prepared by precipitating under controlled conditions a calcium silicate material, drying said material and then treating the dried material with an aqueous solution containing magnesium ions to exchange calcium ions of the calcium silicate with magnesium ions.

CHAS. C. WINDING.